U S009963174B1

(12) United States Patent
Cooper

(10) Patent No.: US 9,963,174 B1
(45) Date of Patent: May 8, 2018

(54) MUD FLAP SYSTEMS

(71) Applicant: William M. Cooper, Skiatook, OK (US)

(72) Inventor: William M. Cooper, Skiatook, OK (US)

( * ) Notice: Subject to any disclaimer, the term of this patent is extended or adjusted under 35 U.S.C. 154(b) by 0 days. days.

(21) Appl. No.: 15/582,332

(22) Filed: Apr. 28, 2017

Related U.S. Application Data

(60) Provisional application No. 62/448,635, filed on Jan. 20, 2017.

(51) Int. Cl.
B62D 25/18 (2006.01)
B62D 25/16 (2006.01)

(52) U.S. Cl.
CPC ......... B62D 25/182 (2013.01); B62D 25/163 (2013.01)

(58) Field of Classification Search
CPC .......................... B62D 25/182; B62D 25/163
See application file for complete search history.

(56) References Cited

U.S. PATENT DOCUMENTS

| 5,044,667 | A | 9/1991 | Manning | |
|---|---|---|---|---|
| 7,507,698 | B2 * | 3/2009 | Franzolin | C11D 17/041 510/220 |
| 8,905,418 | B2 * | 12/2014 | Dixon | B62D 25/188 24/535 |
| 2008/0185809 | A1 * | 8/2008 | Archer | B62D 25/186 280/154 |

* cited by examiner

Primary Examiner — John D Walters
Assistant Examiner — James J Triggs

(57) ABSTRACT

A mud flap system provides a quick and convenient way to install and reinstall mud flaps. It includes a mud flap with a wedged top that slides into a lockable mud flap mount. It pulls away from the mount if hit with enough force before the mount bends or breaks. This eliminates the need for tools and complicated instructions to replace damaged mud flaps.

16 Claims, 5 Drawing Sheets

MUD FLAP SYSTEMS

CROSS REFERENCE TO RELATED APPLICATION

The present application is related to and claims priority to U.S. Provisional Patent Application No. 62/448,635 filed Jan. 20, 2017, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of mud flaps and more specifically relates to a mud flap system.

2. Description of Related Art

Many people use mud flaps on their vehicles. A mud flap is used in combination with the vehicle fender to protect the vehicle, passengers, other vehicles, and pedestrians from mud and other flying debris thrown into the air by the rotating tire(s). They are typically made from a flexible material that is not easily damaged by contact with flying debris, the tire, or the road surface. Mud flaps can be suspended behind the tires, or may be below the rear of the vehicle's wheel wells. Mud flaps for cars, trucks, and semi-trucks are prone to damage from flying debris and may rip off altogether, which can result in fines and citations for drivers and may cause flying debris to hit and damage other vehicles. Therefore, many drivers immediately stop to get mud flaps fixed or replaced. Unfortunately, doing so can be complicated, requiring tools, manipulating rusted bolts, and even trips to mechanics, prolonging the vehicle's downtime, which can be especially costly and frustrating for semi-truck drivers and their companies. A suitable solution is desired.

U.S. Pat. No. 5,044,667 to Kenneth G. Manning relates to a pull-away mud flap. The described pull-away mud flap includes a mud flap which can be easily installed and removed from its mounting bracket. The mud flap is substantially planar in form with a predetermined thickness. The mud flap has a peripheral edge whose cross section is larger than the predetermined thickness of the mud flap. The mounting bracket includes a bracket body from which two flanges extend downwardly. The flanges converge towards one another at their lower ends, forming a slot therebetween. The mounting bracket is provided with any conventional method for mounting the mounting bracket behind the tire of a vehicle. The mud flap is suspended from the mounting bracket by engaging the peripheral edge of the mud flap with the slot of the mounting bracket. The peripheral edge of the mud flap is engaged with the slot of the mounting bracket by inserting the peripheral edge through either end of the slot.

BRIEF SUMMARY OF THE INVENTION

In view of the foregoing disadvantages inherent in the known mud flaps art, the present disclosure provides a novel mud flap systems. The general purpose of the present disclosure, which will be described subsequently in greater detail, is to provide a quick and convenient way to install and reinstall mud flaps.

A mud flap systems is disclosed herein. The mud flap systems includes a mud flap assembly, at least one mud-flap having a wedged top edge and a lockable mud-flap-mount having a top opening configured to receive a wedged top-portion of the at least one mud-flap. In preferred embodiments, the wedged top-portion may be configured to deform under pressure and catch on the top opening of the lockable mud-flap-mount. When pulled downwardly the wedged top-portion is able to slide through the top opening of the lockable mud-flap-mount through a bottom opening allowing for removal and replacement of the at least one mud-flap.

The top opening may have a length and width configured to receive the at least one mud-flap. The top opening comprises said length and said width which is sufficiently large enough to ensure that mount-to-frame mating is universal. The bottom opening of the lockable said mud-flap-mount comprises a length and width configured to receive at least one mud-flap. The wedged top edge comprises a wedge-profile having a greater thickness than that of the body of the mud-flap. The wedged top edge when inserted into the top opening of the lockable mud-flap-mount supports the body of the at least one mud-flap. The at least one mud-flap and the lockable mud-flap-mount are not damaged when the at least one mud-flap is forcibly dislodged from the lockable mud-flap-mount. The mud flap assembly further may further comprise a lock to secure the at least one mud-flap and prevent theft. The mud flap assembly may be mountable to a vehicle behind at least one tire and able to be installed on an existing-mud-flap-frame on the vehicle. The lockable mud-flap-mount may comprise a v-shaped profile in certain embodiments configured to receive the wedged top edge of the at least one mud-flap.

A kit is also disclosed herein including a right side mud-flap, a left side mud flap, a right side lockable mud-flap-mount, a left side lockable mud-flap-mount, and a set of instructions; and mounting accessories.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a mud flap systems, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to mud flaps and more particularly to a mud flap system as used to improve the installation and replacement of mudflaps.

Generally, the present invention provides a quick and convenient way to install and reinstall mud flaps. It includes a mud flap with a wedged top that slides into a lockable mud flap mount. It pulls away from the mount if hit with enough force before the mount bends or breaks. This eliminates the need for tools and complicated instructions to replace damaged mud flaps. The present invention reduces a vehicle's downtime, saving companies and drivers time and money. The mud flap systems may be used for a work pad to lay or kneel on. The device may also be used for advertising and for messages and recognition of things, like: Just Married, or Happy Holidays. They can be removed to give greater access to the tires or frame for mechanics. The mud flaps may be removed quickly for better washing/cleaning of the flap and the vehicle. The device causes mud flaps to last longer, because they keep damage of the flap and frame to a minimum.

Mud flap systems saves time and frustration replacing damaged mud flaps, while getting drivers back on the road quickly and safely. The mud-flap may have a neoprene wedge on the top that can squeeze under pressure and catch on the mount when slid through the mount's top opening. A lock may secure the flap in place and prevent theft.

The mud flap can be offered in general sizes, but can be trimmed at the bottom to achieve an optimal distance between the flap and the road surface. Adapters are separate to incorporate traditional mud flaps but whole mud flaps with molded v-heads are an option. In use, the mount can be secured to a vehicle and the mud flap can be inserted into the mount. If the flap is hit with enough force, the mud flap can break away from the mount before damaging the mount or the frame. To replace the mud flap, drivers can reinstall the one pulled out by impacting a foreign object or if the mud flap is damaged beyond reuse and a spare is required, either scenario can be quickly and simply addressed by dropping the flap into the mount resting frame and proceeds with minimal downtime. The exact specifications may vary upon manufacturing.

Figure 1:
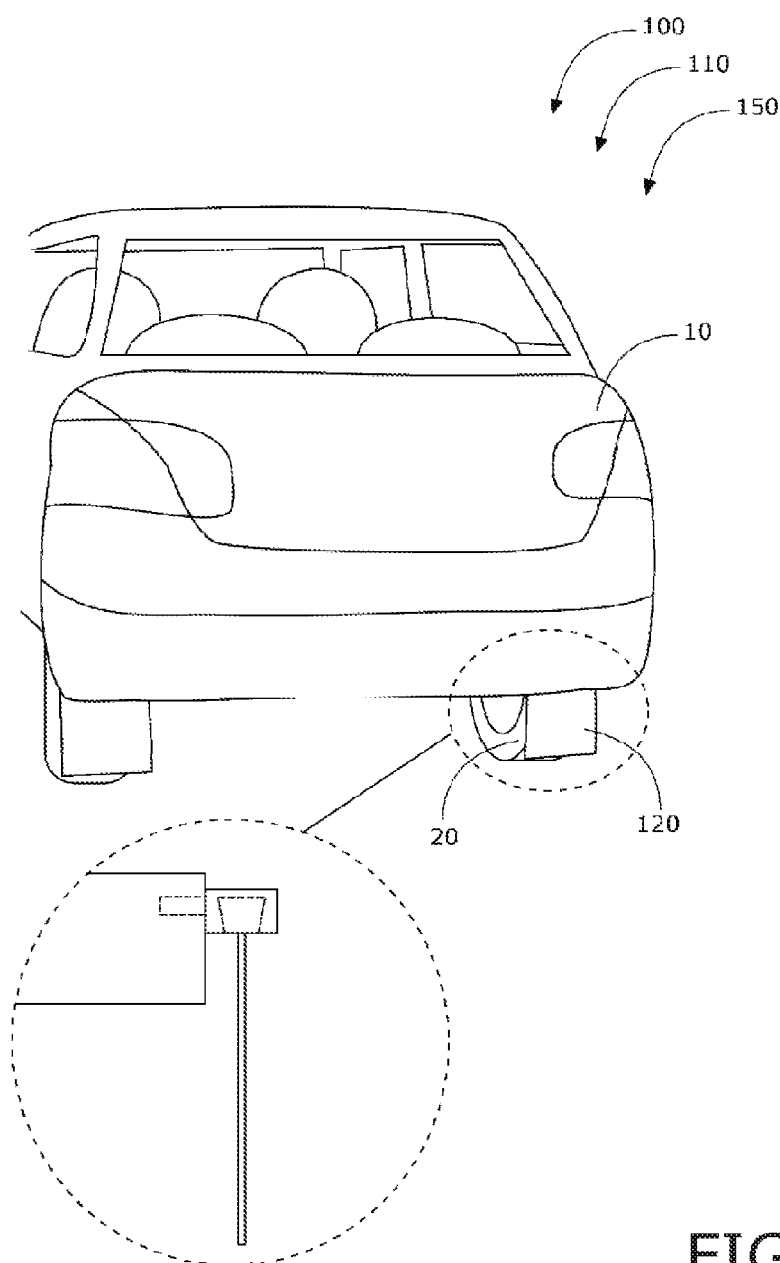
FIG. 1 is a front perspective view of the mud flap systems during an 'in-use' condition, according to an embodiment of the disclosure.

Referring now more specifically to the drawings by numerals of reference, there is shown in FIGS. 1-5, various views of a mud flap systems 100. FIG. 1 shows a mud flap systems 100 during an 'in-use' condition 150, according to an embodiment of the present disclosure. As illustrated, the mud flap systems 100 may include a mud flap assembly 110 having at least one mud-flap 120 including a wedged top edge 122, and a lockable mud-flap-mount 130 having a top opening 132 configured to receive a wedged top-portion 124 of the at least one mud-flap 120. The wedged top-portion 124 is configured to deform under pressure and catch on the top opening 132 of the lockable mud-flap-mount 130. When pulled downwardly the wedged top-portion 124 is able to slide through the top opening of the lockable mud-flap-mount 130 through a bottom opening 134 allowing for removal and replacement of the at least one mud-flap 120.

Figure 2:
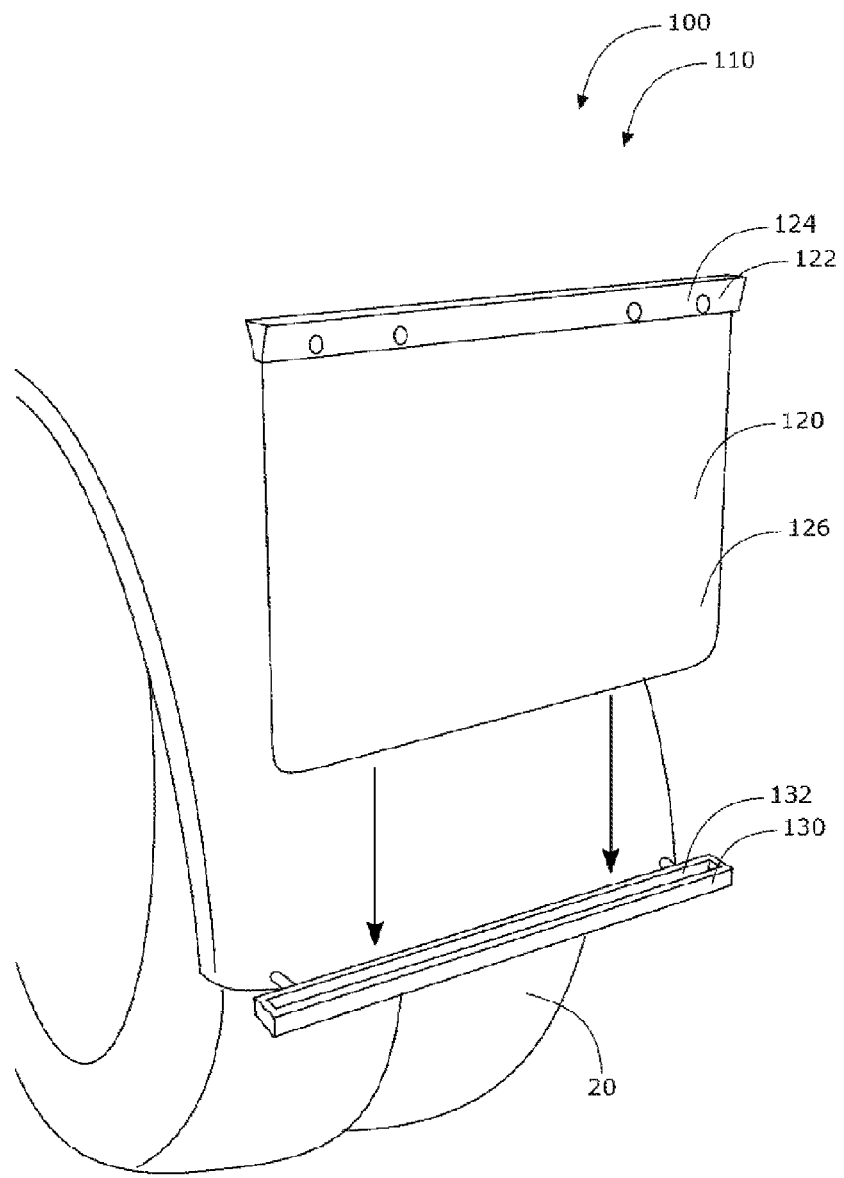
FIG. 2 is a front perspective view of the mud flap systems of FIG. 1, according to an embodiment of the present disclosure.

FIG. 2 shows a front perspective view of the mud flap systems 100 of FIG. 1, according to an embodiment of the present disclosure. As above, the mud flap systems 100 may include at least one mud-flap 120 having a wedged top edge 122. The wedged top edge 124 comprises a greater thickness than that of the body 126 of the at least one mud-flap. The wedged top edge 124 when inserted into the top opening 132 of the lockable mud-flap-mount 130 supports the body 126 of the at least one mud-flap 120. The at least one mud-flap 120 and the lockable mud-flap-mount 130 are not damaged when the at least one mud-flap 120 is forcibly dislodged from the lockable mud-flap-mount 130. The lockable mud-flap-mount 130 comprises a v-shaped profile configured to receive the wedged top-portion 124 of the at least one mud-flap 120. The bottom opening 134 of the lockable mud-flap-mount 130 comprises a length and width configured to receive at least one mud-flap 120.

Figure 3A:
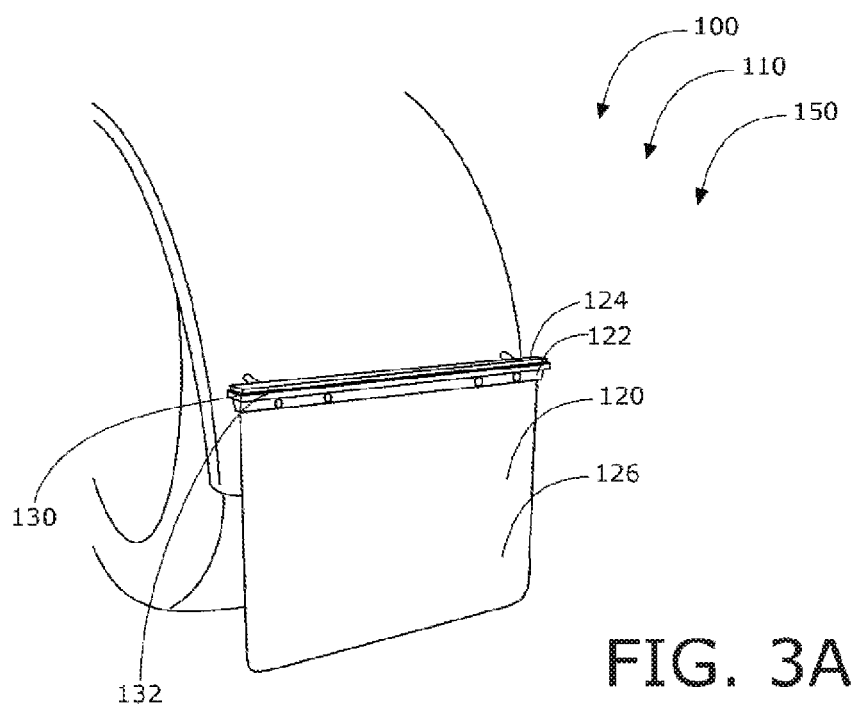
FIG. 3 is a front perspective view of the mud flap systems of FIG. 1, according to an embodiment of the present disclosure.
Figure 3B:
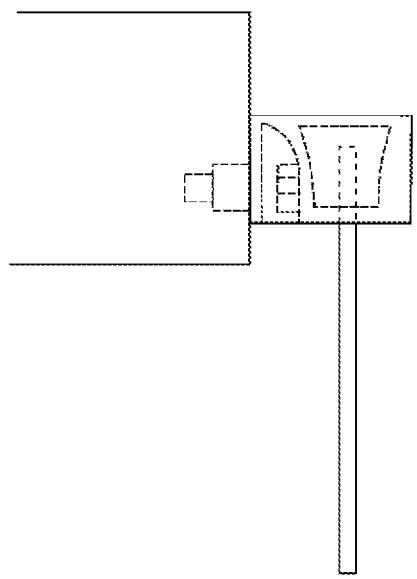

FIG. 3 shows a front perspective view of the mud flap systems 100 of FIG. 1, according to an embodiment of the present disclosure. As above, the mud flap systems 100 may include a mud flap assembly 110 including at least one mud-flap 120 having a wedged top edge 122, and a lockable mud-flap-mount 130 having a top opening 132 configured to receive a wedged top-portion 124 of the at least one mud-flap 120. The top opening 132 comprises a length and width configured to receive the at least one mud-flap 120. The top opening 132 comprises the length and the width which is sufficiently large enough to ensure that mount-to-frame mating is universal.

Figure 4:
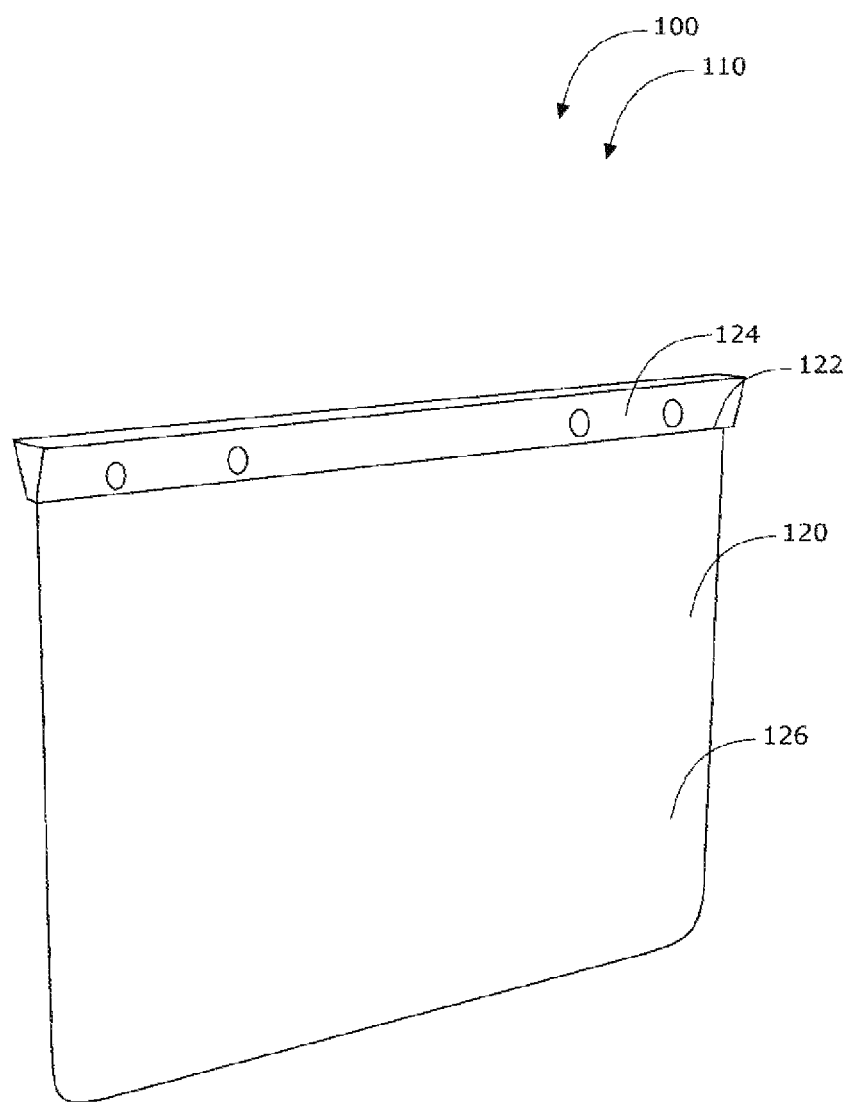
FIG. 4 is a perspective view of the mud flap systems of FIG. 1, according to an embodiment of the present disclosure.

FIG. 4 shows a front perspective view of the mud flap systems 100 of FIG. 1, according to an embodiment of the present disclosure. As above, the mud flap systems 100 may include at least one mud-flap 120 comprising a flexible substantially rectangular body. The wedged top edge 124 comprises a wedge-profile. The wedge top edge 124 may comprise neoprene or other flexible materials. The at least one mud-flap 120 may include a molded v-head in other embodiments. The mud flap assembly 110 further comprises a lock to secure the at least one mud-flap 120 and prevent theft. The mud flap assembly 110 is mountable to a vehicle 10 behind at least one tire 20 and able to be installed on an existing-mud-flap-frame on the vehicle 10. The at least one mud-flap 120 may be trimmed allowing for optimal distance between the at least one mud-flap 120 and a road surface.

Figure 5:
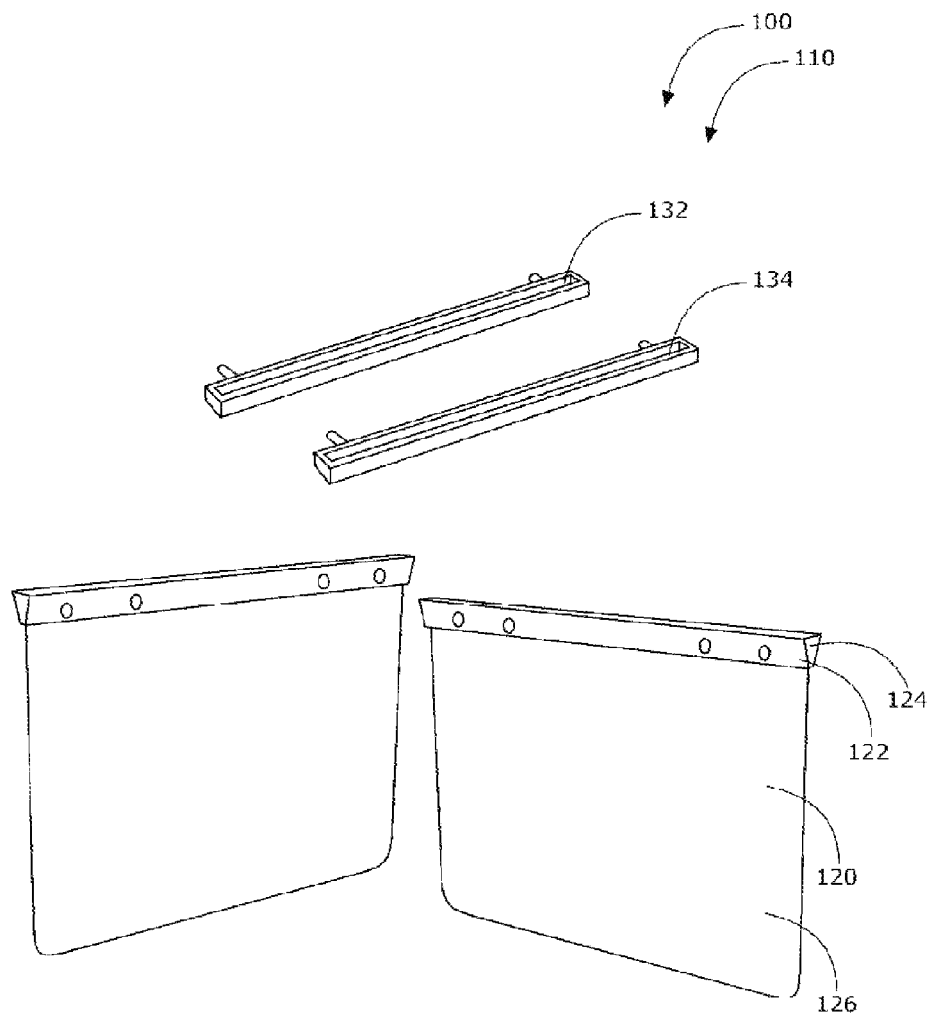
FIG. 5 is a flow diagram illustrating a method of use for the mud flap systems, according to an embodiment of the present disclosure.

FIG. 5 shows a kit of the mud flap systems 100 of FIG. 1, according to an embodiment of the present disclosure. As above, the mud flap systems 100 may include a right side mud-flap 120, a left side mud flap 120, a right side lockable mud-flap-mount 130, a left side lockable mud-flap-mount 130, and a set of instructions, and mounting accessories. The present invention is designed to be mounted to a vehicle 10 behind at least one tire 20. The lockable mud-flap-mount 130 is able to be installed on an existing-mud-flap-frame on the vehicle 10.

According to one embodiment, the mud flap systems 100 may be arranged as a kit. The kit may include a right side mud-flap 120, a left side mud flap 120, a right side lockable mud-flap-mount 130, a left side lockable mud-flap-mount 130, a set of instructions; and mounting accessories. The instructions may detail functional relationships in relation to the structure of the mud flap systems 100 (such that the mud flap systems 100 can be used, maintained, or the like, in a preferred manner).

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A mud flap systems comprising: a mud flap assembly; at least one mud-flap having a wedged top edge; a lockable mud-flap-mount having a top opening configured to receive a wedged top-portion of the at least one mud-flap the wedged top-portion configured to deform under pressure and catch on the top opening of the lockable mud-flap-mount, when pulled downwardly the wedged top-portion is able to slide through the top opening of the lockable mud-flap-mount through a bottom opening allowing for removal and replacement of the at least one mud-flap wherein the at least one mud-flap comprises a flexible substantially rectangular body and wherein the mud flap assembly further comprising a lock to secure the at least one mud-flap and prevent theft.

2. The mud flap systems of claim 1, wherein the top opening comprises a length and width configured to receive the at least one mud-flap.

3. The mud flap systems of claim 2, wherein the top opening comprises said length and said width which is sufficiently large enough to ensure that mount-to-frame mating is universal.

4. The mud flap systems of claim 1, wherein the wedged top edge comprises a wedge-profile.

5. The mud flap systems of claim 4, wherein the wedge top edge comprises neoprene.

6. The mud flap systems of claim 1, wherein the at least one mud-flap comprises a molded v-head.

7. The mud flap systems of claim 1, wherein the mud flap assembly is mountable to a vehicle behind at least one tire.

8. The mud flap systems of claim 7, wherein the lockable mud-flap-mount is able to be installed on an existing-mud-flap-frame on the vehicle.

9. The mud flap systems of claim 1, wherein the at least one mud-flap is able to be trimmed allowing for optimal distance between said at least one mud-flap and a road surface.

10. The mud flap systems of claim 1, wherein the wedged top edge comprises a greater thickness than that of the body of the at least one mud-flap.

11. The mud flap systems of claim 10, wherein the wedged top edge when inserted into the top opening of the lockable said mud-flap-mount supports the body of the at least one mud-flap.

12. The mud flap systems of claim 11, wherein the at least one mud-flap and the lockable said mud-flap-mount are not damaged when the at least one mud-flap is forcibly dislodged from the lockable said mud-flap-mount.

13. The mud flap systems of claim 1, wherein the lockable mud-flap-mount comprises a v shaped profile configured to receive the wedged top edge of the at least one mud-flap.

14. The mud flap systems of claim 12, wherein the bottom opening of the lockable said mud-flap-mount comprises a length and width configured to receive at least one mud-flap.

15. A mud flap system, the system comprising:
a mud flap assembly; at least one mud-flap having a wedged top edge;
a lockable mud-flap-mount having a top opening configured to receive a wedged top-portion of the at least one mud-flap, the wedged top-portion configured to deform under pressure and catch on the top opening of the lockable mud-flap-mount, when pulled downwardly the wedged top-portion is able to slide through the top opening of the lockable mud-flap-mount through a bottom opening allowing for removal and replacement of the at least one mud-flap;
wherein the top opening comprises a length and width configured to receive the at least one mud-flap;
wherein the top opening comprises said length and said width which is sufficiently large enough to ensure that mount-to-frame mating is universal;
wherein the wedged top edge comprises a wedge-profile;
wherein the wedged top edge comprises a greater thickness than that of the body of the at least one mud-flap;
wherein the wedged top edge when inserted into the top opening of the lockable said mud-flap-mount supports the body of the at least one mud-flap;
wherein the at least one mud-flap and the lockable said mud-flap-mount are not damaged when the at least one mud-flap is forcibly dislodged from the lockable said mud-flap-mount;
wherein the mud flap assembly further comprising a lock to secure the Et least one mud-flap and prevent theft;
wherein the mud flap assembly is mountable to a vehicle behind at least one tire;
wherein the lockable mud-flap-mount is able to be installed on an existing-mud-flap-frame on the vehicle;
wherein the lockable mud-flap-mount comprises a v-shaped profile configured to receive the wedged top edge of the at least one mud-flap; and
wherein the bottom opening of the lockable said mud-flap-mount comprises a length and width configured to receive at least one mud-flap.

16. The original mud flap system of claim 15, further comprising a kit including:
a right side mud-flap;
a left side mud flap;
a right side lockable mud-flap-mount;
a left side lockable mud-flap-mount;
a set of instructions; and attachment hardware.

* * * * *